(12) United States Patent
Yokoyama et al.

(10) Patent No.: US 6,800,827 B2
(45) Date of Patent: Oct. 5, 2004

(54) METHOD FOR EFFICIENT LASER ISOTOPE SEPARATION AND ENRICHMENT OF SILICON

(75) Inventors: Atsushi Yokoyama, Ibaraki (JP); Hironori Ohba, Ibaraki (JP); Masashi Hashimoto, Ibaraki (JP); Takemasa Shibata, Ibaraki (JP); Shigeyoshi Arai, Tokyo (JP); Takeshi Ishii, Ibaraki (JP); Akio Ohya, Ibaraki (JP)

(73) Assignees: Japan Atomic Energy Research Institute, Tokyo (JP); Nuclear Development Corporation, Ibaraki-ken (JP)

( * ) Notice: Subject to any disclaimer, the term of this patent is extended or adjusted under 35 U.S.C. 154(b) by 141 days.

(21) Appl. No.: 10/212,865

(22) Filed: Aug. 7, 2002

(65) Prior Publication Data

US 2003/0034243 A1 Feb. 20, 2003

(30) Foreign Application Priority Data

Aug. 20, 2001 (JP) .................................... 2001-249048

(51) Int. Cl.$^7$ ................................................. B01D 5/00
(52) U.S. Cl. .................................................. 204/157.2
(58) Field of Search ..................................... 204/157.2

(56) References Cited

U.S. PATENT DOCUMENTS 4,824,537 A * 4/1989 Arai et al. ............. 204/157.22

OTHER PUBLICATIONS

Okada et al., "Infrared Laser Isotope Separation of Silicon", Reza Kagaku Kenkyu (no month, 1996), vol. 18, pp. 74–76. Abstra only.*

* cited by examiner

Primary Examiner—Edna Wong
(74) Attorney, Agent, or Firm—Banner & Witcoff, Ltd.

(57) ABSTRACT

A method for laser-assisted separation and enrichment of silicon isotopes such as $^{28}Si$, $^{29}Si$ and $^{30}Si$ on the basis of infrared multiple-photon dissociation of silicon halides represented by $Si_2F_6$, wherein the silicon halides are irradiated synchronously with multiple infrared pulsed laser beams at different wavelengths.

2 Claims, 5 Drawing Sheets

SYSYEM FOR SUPPLYING FEED, RECOVERING IT IN SEPARATED FORM AND MEASURING THE ABUNDANCE RATIOS OF ISOTOPES

Fig. 2
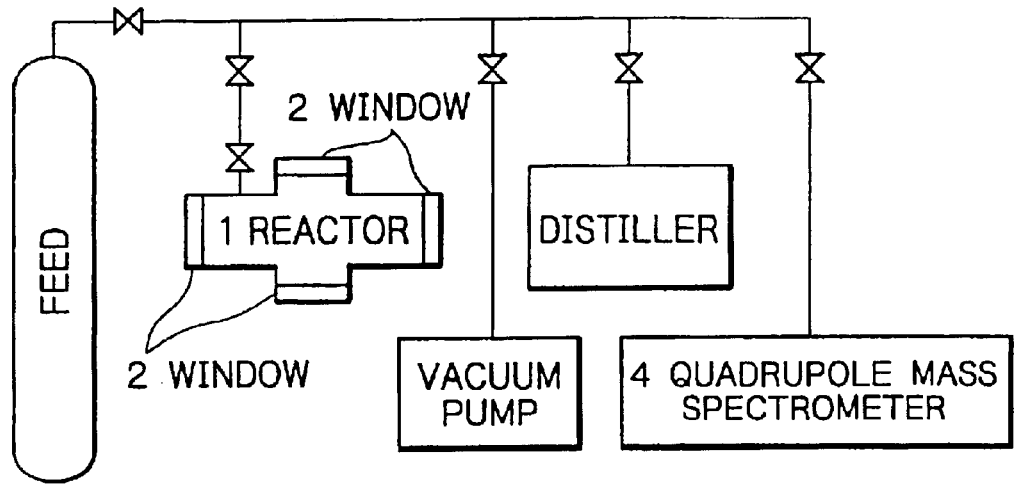
SYSYEM FOR SUPPLYING FEED, RECOVERING IT IN SEPARATED FORM AND MEASURING THE ABUNDANCE RATIOS OF ISOTOPES
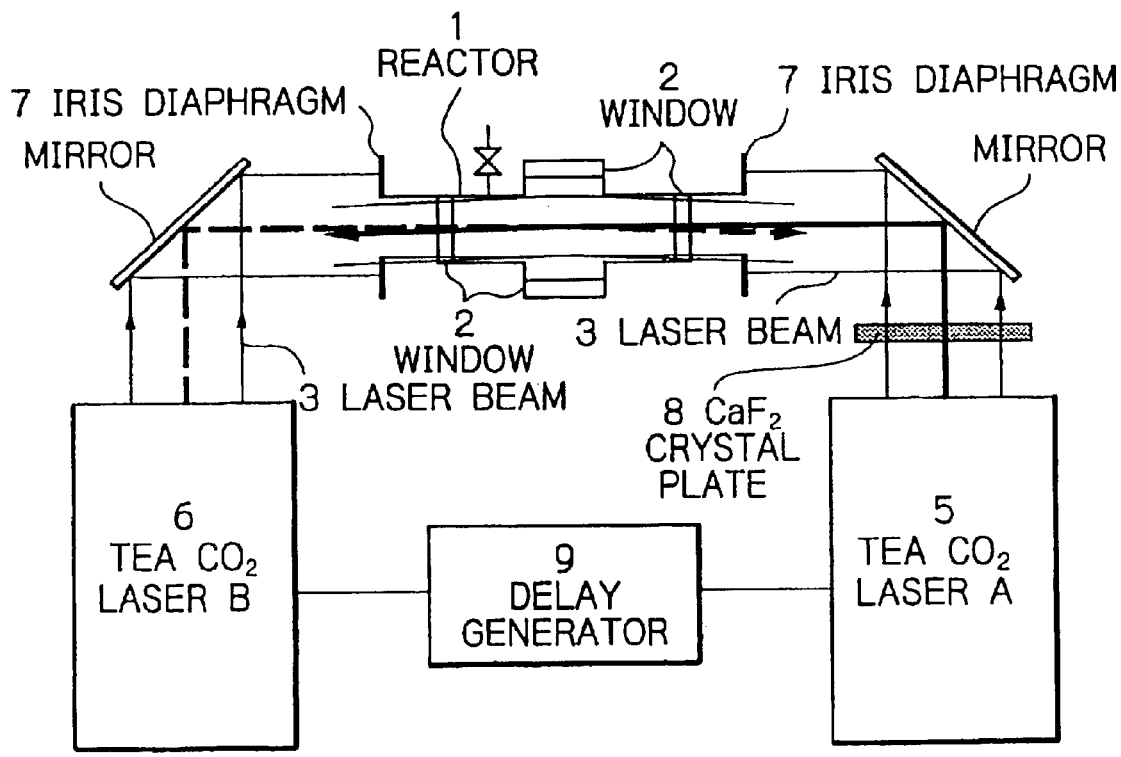
SYSTEM FOR APPLYING INFRARED PULSED LASER BEAM

METHOD FOR EFFICIENT LASER ISOTOPE SEPARATION AND ENRICHMENT OF SILICON

This application is based upon and claims the benefit of priority from Japanese Patent Application No. 2001-249048, filed Aug. 20, 2001, the entire contents of this application are incorporated herein by reference.

BACKGROUND OF THE INVENTION

This invention relates to a method for laser isotope separation and enrichment of silicon on the basis of infrared multiple-photon dissociation of silicon halides, particularly to a method in which the selectivity for and yield of isotope to be separated and enriched are remarkably improved by irradiating silicon halides synchronously with two or more infrared pulsed laser beams at different wavelengths.

Non-radioactive stable isotopes exist for many elements and their use is being expanded since there is no fear of potential risk for radiation exposure.

Natural silicon consists of isotopes of mass numbers 28, 29 and 30 in the abundance ratios of 92.2% ($^{28}$Si), 4.7% ($^{29}$Si) and 3.1% ($^{30}$Si).

Separated and enriched stable silicon isotopes have already been used in various fields and their applications in future have also been proposed. Namely, $^{28}$Si and $^{30}$Si have been used as tracers in studies on the effect of silicon fertilizers on rice and $^{30}$Si has also been used in the production of novel nuclides. The other isotope $^{29}$Si has been used in the ion implantation processes for semiconductor fabrication. In the past few years, the single crystal of high-purity $^{28}$Si has been demonstrated to show higher thermal conductivity than that of natural silicon and semiconductor chips using it are considered to permit faster heat dissipation; therefore, the single crystal of high-purity $^{28}$Si is drawing much attention as a promising candidate that contributes to further increase in the packaging density and operating speed of integrated circuits. As a potential application of single crystal silicon that is totally free of $^{29}$Si having a nuclear spin, namely, the single crystal of high-purity $^{28}$Si, the idea of the quantum computer using the magnetic properties of dopant phosphorus has been proposed and met with growing interest.

Thus, silicon isotopes have a greater possibility for large-scale use in various fields in the near future; however, in order to meet the demand for expanded use of silicon isotopes, it is essential to develop a technique capable of high-efficient isotope separation and enrichment.

Separation and Enrichment of Silicon Isotopes by Methods other than the Laser-Assisted Technology An electromagnetic mass separator has long been used to separate silicon isotopes. In this method, however, the yield cannot be increased to a practical level by using even a much larger separator and the desired isotopes cannot be supplied in large enough quantities at low cost.

In Russia, gigantic centrifugal separators originally developed as a component of military nuclear facilities have been diverted to the purpose of silicon isotope separation; however, such gigantic centrifugal separators require huge initial investment and cannot be operated by the private sector without touching the sensitive issue of military secret.

Separation and Enrichment of Silicon Isotopes by the Laser-Assisted Technology

In order to separate and enrich silicon isotopes, the laser-assisted method has been proposed that is based on a carbon dioxide laser induced isotopically selective infrared multiple-photon dissociation of $Si_2F_6$ (Japanese Patent H2-56133, U.S. Pat. No. 4,824,537, EU Patent 0190758, Japanese Patent H5-80245, and S. Arai, H. Kaetsu and S. Isomura, Appl. Phys., B32, 199 (1991)). On the pages that follow, the laser-assisted method has been described in details and then their several problems have been pointed out.

[Infrared Multiple-Photon Dissociation of $Si_2F_6$]

When molecules are irradiated with intense laser beam in a region within their infrared absorption bands, the individual molecules may sometimes be dissociated by absorbing as many as several tens of photons. This phenomenon is called infrared multiple-photon dissociation. FIG. 1 shows an infrared absorption spectrum for a silicon fluoride $Si_2F_6$ and emission lines from a carbon dioxide laser. As shown, $Si_2F_6$ has an infrared absorption band in the emitting region of the carbon dioxide laser due to the stretching of the Si—F bond. If one of the emission lines in the 10R- or 10P-branch of the carbon dioxide laser is selected and $Si_2F_6$ is irradiated with its intense pulsed laser light (hv) the individual molecules of $Si_2F_6$ absorb a large number of photons to become excited in a highly vibrational state and are eventually decomposed into $SiF_2$ and $SiF_4$. This is what is commonly called the infrared multiple-photon dissociation of $Si_2F_6$ and described by the following scheme, where n refers to the number of laser photons absorbed by the $Si_2F_6$ molecule:

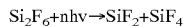

One of the two decomposition products, $SiF_4$ is a stable gas molecule whereas $SiF_2$ is an unstable molecule which undergoes cascade polymerization to produce a white solid substance having the composition $(SiF_2)_m$ in accordance with the following scheme, where m refers to the number of the $SiF_2$ molecules being polymerized:

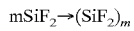

Studies on pyrolysis have shown that the process of $Si_2F_6$ decomposition into $SiF_2$ and $SiF_4$ requires energy of about 190 kJ/mol. This value means that the molecule of $Si_2F_6$ that has undergone infrared multiple-photon dissociation must have absorbed at least 17 or more photons from the carbon dioxide laser.

[Absorption Spectrum and Isotope Shift]

The infrared absorption spectrum of $Si_2F_6$ shown in FIG. 1 was measured with an infrared spectrophotometer. In the ordinary measurement using the spectrophotometer, the intensity of incident light is low and an absorption spectrum corresponds to the process in which a molecule of interest absorbs one photon. The spectrum corresponding to this single-photon absorption is hereunder referred to as the ordinary infrared absorption spectrum.

In the ordinary infrared absorption spectrum of $Si_2F_6$, the peak of the absorption band due to the stretching of the Si—F bond is located at 990 cm$^{-1}$ for $^{28}$Si—F, at 982 cm$^{-1}$ for $^{29}$Si—F and at 974 cm$^{-1}$ for $^{30}$Si—F. An effect generally called the isotope shift is often observed between absorption bands for different isotopes. Since the peaks of the absorption bands for $^{28}$Si—F, $^{29}$Si—F and $^{30}$Si—F in FIG. 1 are located so close to each other that adjacent bands overlaps, and, in addition, the amounts of $^{29}$Si—F and $^{30}$Si—F are much smaller than that of $^{28}$Si—F, it is difficult to distinguish between the peak positions except for $^{28}$Si—F.

Each $Si_2F_6$ molecule absorbs at least 17 photons and undergoes infrared multiple-photon dissociation. As is well known, the multiple-photon absorption spectrum which corresponds to the process of molecular absorption of many photons differs from the ordinary single-photon absorption spectrum shown in FIG. 1 and the peak positions of the absorption bands shift toward a longer wavelength side or toward a smaller wave number side, and the widths of the absorption bands become broader. The occurrence of isotope shifts comparable to those in the single-photon absorption spectrum is also predicted for the multiple-photon absorption spectrum and, in fact, has been demonstrated in experiments.

[Principle of Laser Isotope Separation and Enrichment]

Noting the difference in infrared multiple-photon absorption that is observed between molecules containing different isotopes, one can irradiate such molecules with laser beam at an appropriate wavelength and thereby perform selective multiple-photon excitation of a molecule containing an isotope of interest so as to decompose it. Consequently, the isotope of interest is enriched in either the decomposition product or the yet to be decomposed feed. This is the principle of isotope separation and enrichment on the basis of infrared multiple-photon dissociation.

[Current Status of Laser Isotope Separation and Enrichment of Silicon]

The infrared multiple-photon dissociation of $Si_2F_6$ by a one-color pulsed laser beam from a TEA (Transversely Excited Atmospheric pressure) $CO_2$ laser has been studied in great detail (M. Kamioka, S. Arai, Y. Ishikawa, S. Isomura and N. Takamiya, Chem. Phys. Lett., 119, 357(1985); M. Kamioka, Y. Ishikawa, H. Kaetsu, S. Isomura and S. Arai, J. Phys. Chem., 90, 5727 (1986)). According to the results of those studies, the dissociation induced with pulsed laser beam at around 950 cm$^{-1}$ caused $^{29}Si$ and $^{30}Si$ to be highly enriched in the gaseous product $SiF_4$ or the solid product $(SiF_2)_m$ whereas $^{28}Si$ was highly enriched in the undecomposed $Si_2F_6$.

This technique is capable of efficient separation and enrichment of silicon isotopes with a small apparatus. Through combination of appropriate operations including continuous supply of the feed, irradiation with a high-power TEA $CO_2$ laser and continuous recovery of the product and the undecomposed feed, a pilot experiment of separating silicon isotopes has been already performed. A further development effort is anticipated to realize mass supply of silicon isotopes at low cost.

[Problems with the Prior Art Laser Isotope Separation and Enrichment of Silicon]

The R&D activities made to date have revealed that in order to separate and enrich silicon isotopes by means of a one-color laser beam, the applied laser beam must have a wave number around 950 cm$^{-1}$. If the laser beam has a wavelength closer to the absorption band of $Si_2F_6$, namely, a larger wave number, the dissociation yield increases but, on the other hand, the isotope selectivity decreases markedly. If the laser beam has a smaller wave number, both the dissociation yield and the isotope selectivity decrease. However, as shown in FIG. 1, the single-photon absorption at around 950 cm$^{-1}$ is very weak for each of the three isotope molecules. One must therefore conclude that the efficiency at which the molecule first absorbs photons is extremely low and so is the efficiency of total process of multiple-photon absorption.

With a view to meeting the demand for realizing large-scale utilization of silicon isotopes in the future, the present inventors made intensive theoretical and experimental work for increasing the efficiency of laser isotope separation and enrichment and successfully developed the following method.

SUMMARY OF THE INVENTION

In its basic aspect, the invention solves the above-mentioned problems of the prior art by irradiating $Si_2F_6$ synchronously with pulsed beams from two or more TEA $CO_2$ lasers at different wavelengths.

Specifically, the invention provides an efficient method for separation and enrichment of silicon isotopes such as $^{28}Si$, $^{29}Si$ and $^{30}Si$ on the basis of laser-assisted infrared multiple-photon dissociation of silicon halides, which comprises the steps of emitting laser beams from two or more laser sources at different wavelengths, adjusting the energy of the emitted laser beams by either causing them to pass through $CaF_2$ crystal plates or controlling the discharge voltage across the laser electrodes, and irradiating silicon halides synchronously with the adjusted beams.

The invention also provides an efficient apparatus for separation and enrichment of silicon isotopes such as $^{28}Si$, $^{29}Si$ and $^{30}Si$ on the basis of laser-assisted infrared multiple-photon dissociation of silicon halides, which comprises two or more laser sources for irradiating silicon halides with laser beams at different wavelengths, $CaF_2$ crystal plates through which the laser beams emitted from laser sources are passed in order to adjust the energy of laser beams, a reactor having NaCl crystal or KCl crystal windows through which the laser beams are launched into the reactor to irradiate silicon halides contained in the reactor, and a delay generator for adjusting the timing of the pulsed beams from two or more laser sources such that they pass through the reactor simultaneously.

BRIEF DESCRIPTION OF THE DRAWINGS

FIG. 2 shows in block form an experimental setup and an experimental procedure that may be used to implement the present invention:

DETAILED DESCRIPTION OF THE INVENTION (Effectiveness of Two-Color Laser Beams Irradiation)

The invention is described below in detail with reference to the accompanying drawings. In infrared multiple-photon absorption of a rather complex molecule such as $Si_2F_6$, the stage of absorption of the first few laser photons is important for improving the efficiency and it may be held that the subsequent stage of multiple-photon absorption can invariably keep high efficiency. While the mechanism underlying this phenomenon is complex, it can at least be said that once several photons have been absorbed in a molecule, state density in the molecule is high enough to cancel any disagreement between optical transition and photon energy.

Figure 1:
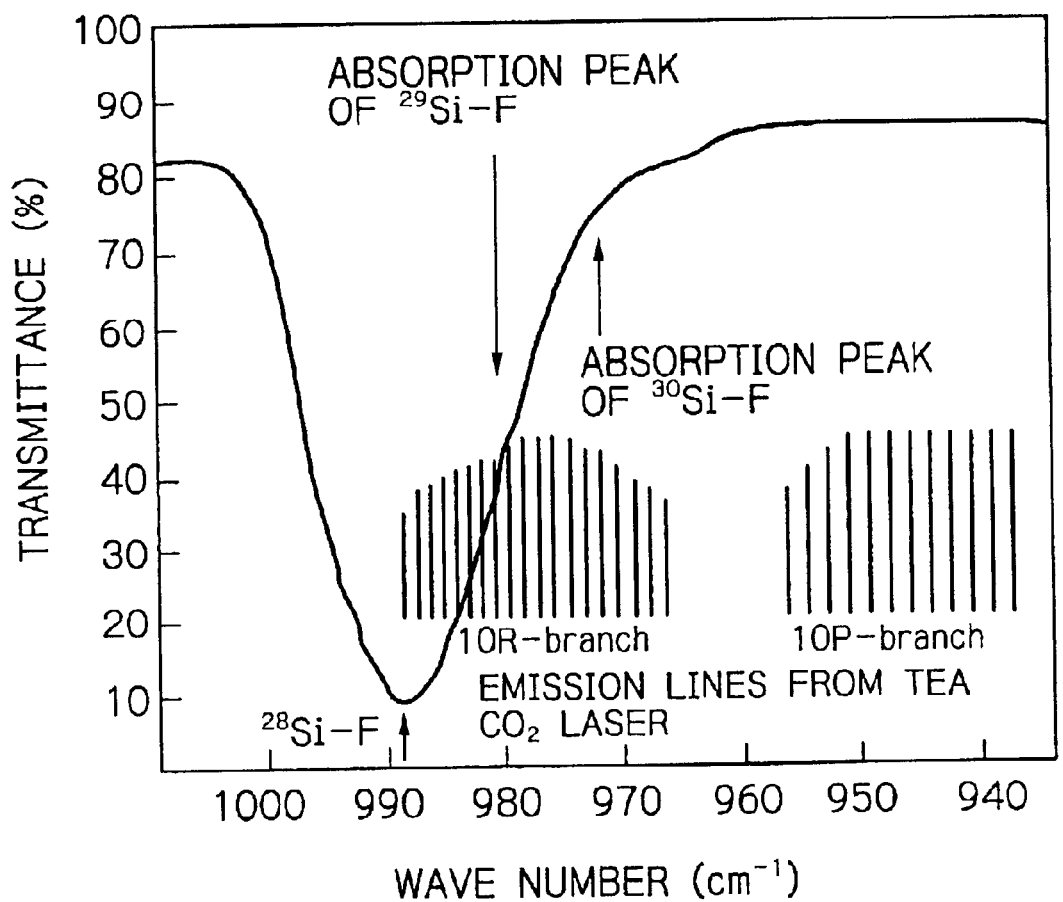
FIG. 1 shows an infrared absorption spectrum of $Si_2F_6$ including absorption bands for $^{28}Si$—F, $^{29}Si$—F and $^{30}Si$—F stretching, as well as relative intensities of emission lines of the 10R- and 10P-branches from a TEA $CO_2$ laser.

Referring to the absorption spectrum in FIG. 1, one can see that in the range of 965–975 cm$^{-1}$ where emission lines of the 10R-branch occur, the isotope molecules containing $^{29}Si$ and $^{30}Si$ have a comparatively strong absorption. The isotope shift is also substantial. Therefore, the present inventors first chose a 10R line from a TEA $CO_2$ laser and applied very weak pulsed laser beam of that line to $Si_2F_6$.

Subsequently, the inventors chose a 10P line from a different TEA $CO_2$ laser and applied strong pulsed laser beam of that line to $Si_2F_6$, thereby causing it to undergo infrared multiple-photon dissociation. The application of the extremely weak pulsed laser beam of 10R line was intended to excite $Si_2F_6$ molecules in the initial stage by efficient and isotopically selective absorption of 1–3 laser photons, whereas the application of the strong pulsed laser beam of 10P line was intended to excite the molecules by the successive multiple-photon absorption of about fifteen or more photons.

The pulsed laser beam of 10R line must be extremely weak. As shown in previous studies, if this pulsed laser beam is unduly strong to induce infrared multiple-photon dissociation, the decomposition is isotopically non-selective. It is therefore necessary that the intensity of the pulsed laser beam of 10R line be held to such an extent that one molecule absorbs a few photons in an isotopically selective manner. In order to adjust the intensity of laser beam per pulse (i.e. its fluence), one may use a $CaF_2$ crystal plate, as well as lenses and every other suitable optics known in the art.

The strong pulsed laser beam of 10P line must be applied while the effect of the weak pulsed laser beam irradiation of 10R line persists, namely, while the $Si_2F_6$ molecules remain at the vibrationally excited states. The term "synchronous" as used herein means that while the effect of one applied pulsed laser beam persists, namely, while the molecules of $Si_2F_6$ or other sample to be processed remain at the vibrationally excited states by irradiating the pulsed laser beam, the other pulsed laser beam is applied.

The technique for achieving efficient separation and enrichment by applying laser beam at different wavelengths is applicable not only to separation and enrichment by using absorption bands of $Si_2F_6$ near at 990 $cm^{-1}$ but also to separation and enrichment by using other bands such as near at 820 $cm^{-1}$. The compounds that can be processed by the technique are by no means limited to $Si_2F_6$ and it can be equally applied to the laser-assisted isotope enrichment and separation using other silicon halides represented by $SiF_4$, $SiF_3H$, $SiF_3Cl$, $SiF_3Br$ and $SiF_3CH_3$. The TEA $CO_2$ laser is not the only infrared laser that can be used and a free electron laser can also be used. Three or more laser wavelengths may be used in the invention and multiple laser beams may be incident at every possible angle (e.g. in opposite directions, in the same direction or in crossed directions) as long as they are applied synchronously.

We describe the invention in greater detail with reference to the following preferred examples which are by no means intended to limit the scope of the invention.

EXAMPLE 1

Figure 3:
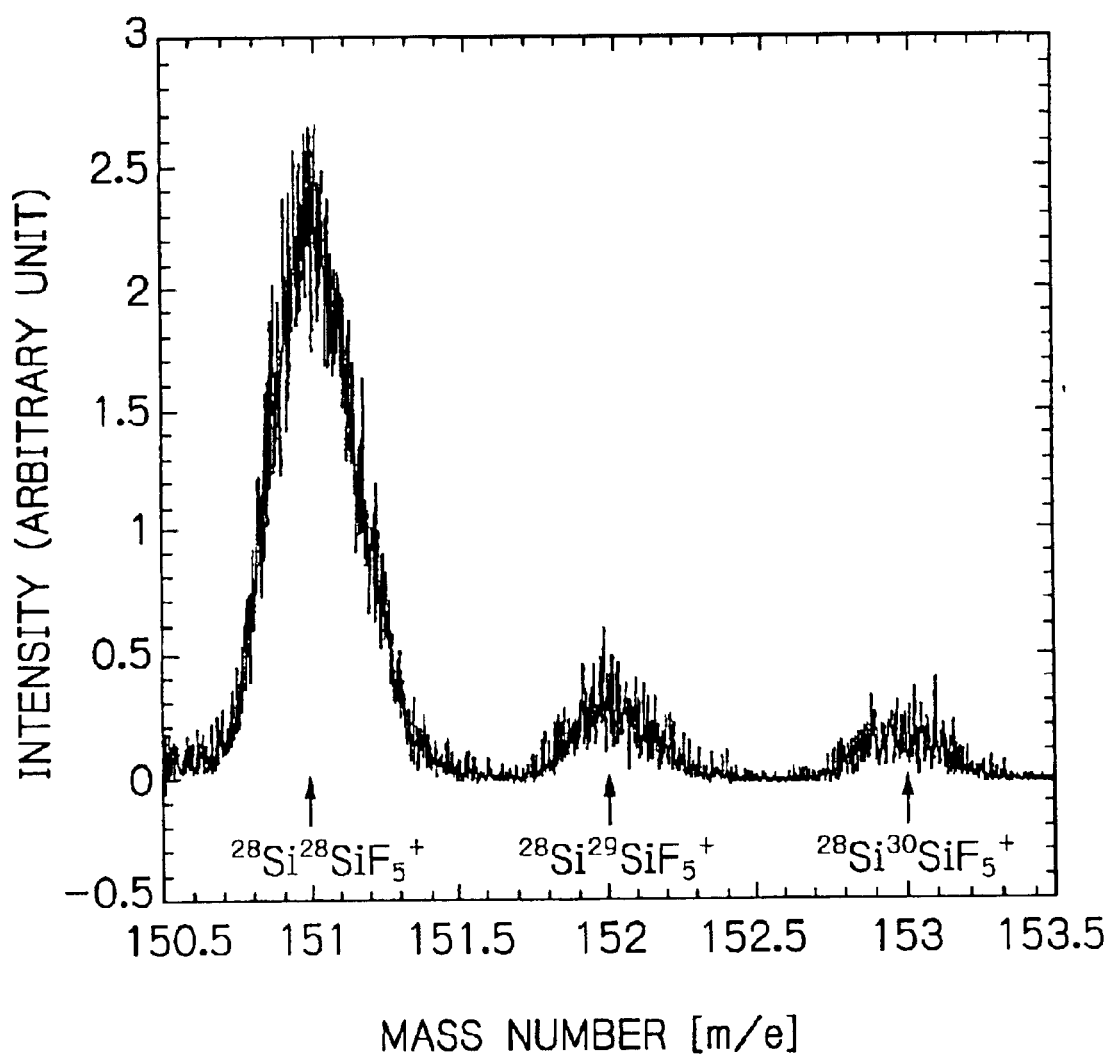
FIG. 3 is a mass spectrum for $Si_2F_6$ as measured with a quadrupole mass spectrometer, showing natural abundance of its isotopes.

Details for the conditions and results of experiments are described in the respective Examples and Comparative Examples. FIG. 2, shows in block form the experimental setup and the experimental procedure used commonly in the Examples and Comparative Examples. Reactor 1 consisted of two Pyrex (registered trademark) glass tubes of 2.0 cm in inner diameter combined in cross form. The four ends of each glass tubes were fitted with a NaCl or KCl crystal window 2 that was completely sealed by means of a fluorine-based rubber O-ring and Teflon (registered trademark) packing. The NaCl or KCl crystal window 2 was a disc 4.0 cm in diameter and 0.4 cm in thickness that could transmit a wide range of infrared light. The reactor 1 was 10.0 cm long in the direction of passage of pulsed laser beam 3 whereas it was 5.0 cm long in the transverse direction in which infrared absorption spectra would be measured. After fully evacuating the reactor 1 with a vacuum pump, 2 Torr of $Si_2F_6$ was sampled into the reactor 1 from a feed supply. FIG. 3 shows a mass spectrum for the natural isotopes in the feed $Si_2F_6$ as measured with a quadrupole mass spectrometer 4. The feed $Si_2F_6$ was composed of six isotope molecules $^{28}Si^{28}SiF_6$, $^{28}Si^{29}SiF_6$, $^{28}Si^{30}SiF_6$, $^{29}Si^{29}SiF_6$ and $^{30}Si^{30}SiF_6$. The abundance ratios of $^{29}Si^{29}SiF_6$, $^{29}Si^{30}SiF_6$ and $^{30}Si^{30}SiF_6$ were small and mass spectrum peaks for $^{28}Si^{28}SiF_5^+$, $^{28}Si^{29}SiF_5^+$ and $^{28}Si^{30}SiF_5^+$ fragment ions were observed at mass numbers of 151, 152 and 153, respectively. From the spectrum peak ratios, the abundance ratios of $^{28}Si$, $^{29}Si$ and $^{30}Si$ were calculated to be 92.2%, 4.7% and 3.1%, respectively, which agree with the natural abundance of silicon isotopes.

Transversely excited atmospheric pressure carbon dioxide laser A 5 was set to emit a 10R(6) line at 966.23 $cm^{-1}$ and TEA $CO_2$ laser B 6 was set to emit a 10P(8) line at 954.55 $cm^{-1}$. Metallic iris diaphragms 7 were used to shape the laser beam 3 from both lasers into a circular spot having a diameter of 1.5 cm. A suitable number of $CaF_2$ crystal plates 8 were inserted between the TEA $CO_2$ laser A 5 and the reactor 1 so that the fluence per pulse within the reactor 1 would be adjusted to 0.098 $J/cm^2$. The $CaF_2$ crystal plates 8 were discs with a diameter of 4 cm and a thickness of 0.2 cm which would absorb a small amount of infrared light at 966.23 $cm^{-1}$. As an increasing number of the crystal plates 8 were inserted, the fluence of the pulsed laser beam would decrease progressively. In experiments on infrared multiple-photon dissociation, the intensity of laser beam per pulse is usually expressed by the quantity of "fluence". Fluence is the pulse energy per unit cross-sectional area of laser beam and is equal to the power meter reading of pulse energy divided by the cross-sectional area of the pulsed laser beam. By controlling the discharge voltage across the laser electrodes, the fluence of the pulsed laser beam from the TEA $CO_2$ laser B 6 was adjusted to 0.76 $J/cm^2$ within the reactor 1. The two laser beams 3 were launched into the reactor 1 through the opposed windows and crossed each other within the reactor 1. The timing of irradiation was adjusted by means of a delay generator 9 such that the pulsed beam from the TEA $CO_2$ laser A 5 would pass through the reactor 1 simultaneously with the pulsed beam from the TEA $CO_2$ laser B 6. Under these experimental conditions, $Si_2F_6$ molecules were irradiated with each of 500 pulses from the TEA $CO_2$ lasers A 5 and B 6.

Figure 4:
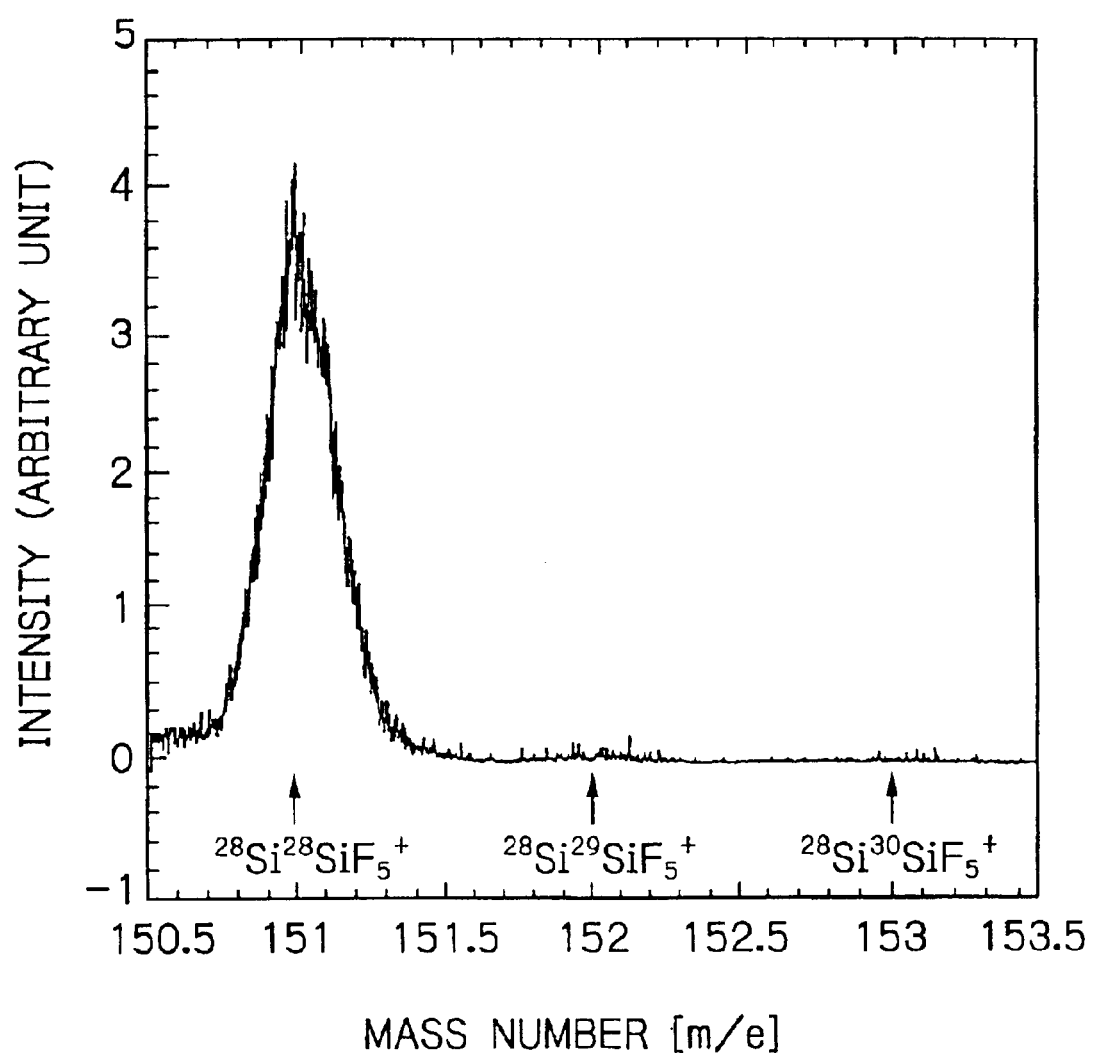
FIG. 4 is a mass spectrum for $Si_2F_6$ as measured with a quadrupole mass spectrometer in Example 1 after irradiation of 500 pulses.

An infrared absorption spectrum for the sample was measured precisely both before and after irradiation with laser beam and the decomposition ratio of the feed $Si_2F_6$ was determined from the difference between the two spectra. Under the irradiation condition above mentioned, 34.7% of the feed had been decomposed. In the spectrum portion corresponding to $SiF_4$, absorption bands for $^{28}SiF_4$, $^{29}SiF_4$ and $^{30}SiF_4$ were observed in overlap. After spectrum measurement, the sample in the reactor 1 was condensed at the temperature of liquid nitrogen and taken up by a recovery unit including a distiller. The white solid product $(SiF_2)_m$ could not be collected since it adhered to the inner wall of the reactor 1. The condensed sample was further distilled at low temperature so that it separated into the product $SiF_4$ and the undecomposed feed $Si_2F_6$. The undecomposed feed $Si_2F_6$ was introduced into the quadrupole mass spectrometer 4 and the abundance ratios of the silicon isotopes were determined from the intensity of the signal for $Si_2F_5^+$. The abundance ratios of the isotopes as determined from the mass spectrum shown in FIG. 4 were 99.63%, 0.36% and 0.01% for $^{28}Si$, $^{29}Si$ and $^{30}Si$, respectively.

EXAMPLE 2

Two Torr of $Si_2F_6$ was sampled into the reactor 1. Transversely excited atmospheric pressure carbon dioxide laser A 5 was set to emit a 10R(6) line at 966.23 cm$^{-1}$ and TEA CO$_2$ laser B 6 was set to emit a 10P(8) line at 954.55 cm$^{-1}$. A suitable number of CaF$_2$ crystal plates 8 were inserted between the TEA CO$_2$ laser A 5 and the reactor 1 such that the fluence in the reactor 1 would be adjusted to about 0.098 J/cm$^2$. By controlling the discharge voltage in the laser, the fluence of the pulsed beam from the TEA CO$_2$ laser B 6 was adjusted to 0.76 J/cM$^2$ within the reactor 1. Under these experimental conditions, Si$_2$F$_6$ molecules were irradiated with each of 1000 pulses from the TEA CO$_2$ lasers A 5 and B 6. In Example 2, a large number of pulses were applied to Si$_2$F$_6$ so that almost all molecules containing $^{29}$Si and $^{30}$Si were decomposed and $^{28}$Si was highly enriched in the undecomposed feed Si$_2$F$_6$.

Figure 5:
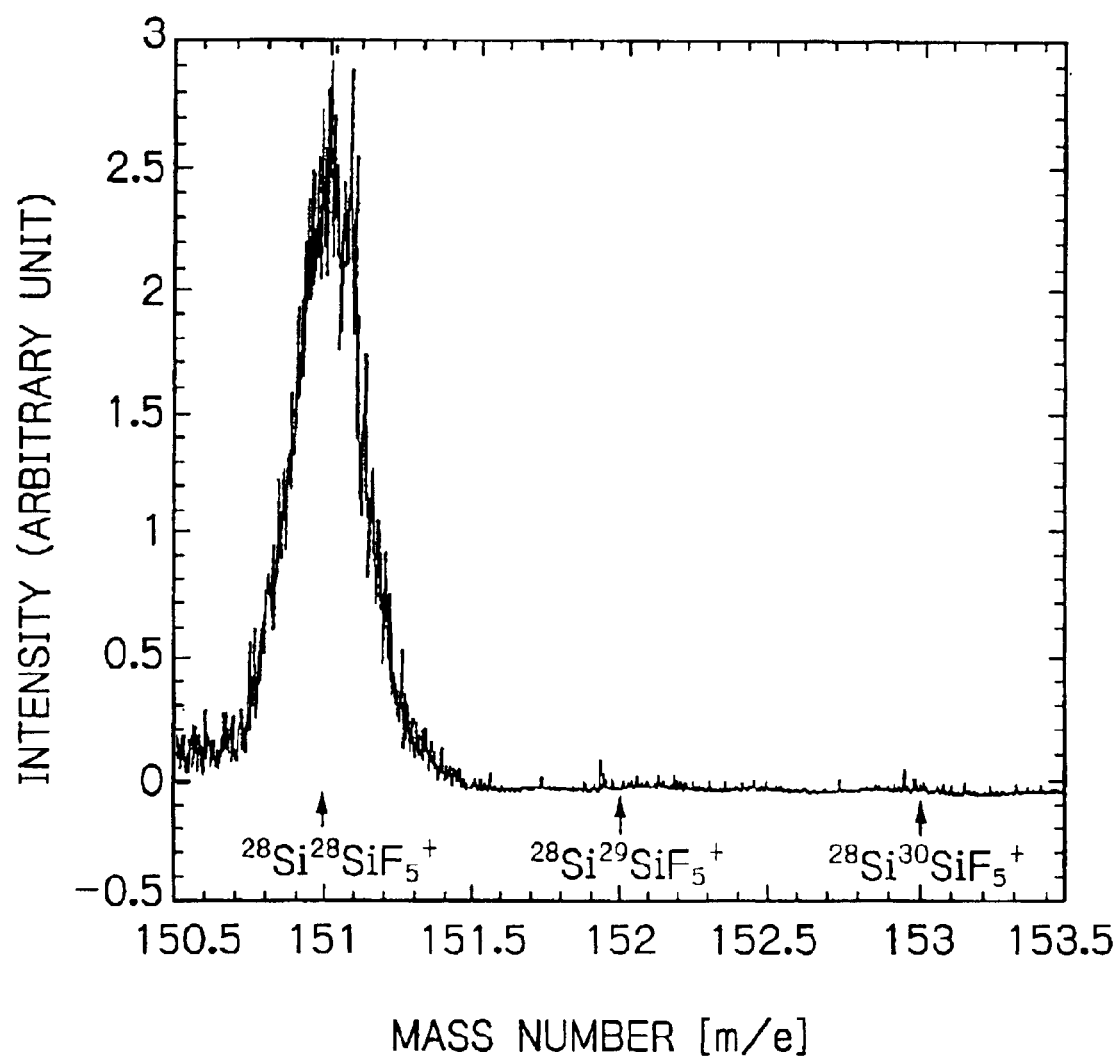
FIG. 5 is a mass spectrum for $Si_2F_6$ as measured with a quadrupole mass spectrometer in Example 2 after irradiation of 1000 pulses.

From the difference between the infrared absorption spectra for both before and after laser beam irradiation, Si$_2$F$_6$ molecules were found to have been decomposed by 46.9%. The irradiated sample was distilled at low temperature so that it was separated into SiF$_4$ and Si$_2$F$_6$, which were each subjected to mass spectrometry. The result is shown as a mass spectrum in FIG. 5, from which one can see that $^{29}$Si and $^{30}$Si in the undecomposed feed Si$_2$F$_6$ were hardly detectable with the mass spectrometer 4 whereas almost all of $^{28}$Si was concentrated in the undecomposed feed.

COMPARATIVE EXAMPLE 1

Two Torr of Si$_2$F$_6$ was sampled into the reactor 1. In Comparative Example 1, the TEA CO$_2$ laser A 5 was not used and an irradiation experiment was conducted at a one-color. The TEA CO$_2$ laser B 6 was set to emit a 10P(8) line at 954.55 cm$^{-1}$. As shown in previous studies, this emission line is optimum for the purpose of highly enrichment of $^{28}$Si in the undecomposed Si$_2$F$_6$. By controlling the discharge voltage in the laser, the fluence in the reactor 1 was adjusted to 1.0 J/cm$^2$. Under these experimental conditions, Si$_2$F$_6$ molecules were irradiated with 2000 pulses from the TEA CO$_2$ laser B 6.

From the difference between the infrared absorption spectra for both before and after laser beam irradiation, Si$_2$F$_6$ molecules were found to have been decomposed by 35.6%. The irradiated sample was distilled at low temperature so that it was separated into SiF$_4$ and Si$_2$F$_6$ and the abundance ratios of the silicon isotopes in the undecomposed Si$_2$F$_6$ were measured with a mass spectrometer. The results were 99.35% for $^{28}$Si, 0.63% for $^{29}$Si and 0.02% for $^{30}$Si. The degree of enrichment of $^{28}$Si was somewhat lower than in the case of irradiation to laser beam at two-colors. Considering that as many as 2000 pulses had been applied, the efficiency of dissociation per pulse was considerably low.

COMPARATIVE EXAMPLE 2

Two Torr of Si$_2$F$_6$ was sampled into the reactor 1. Transversely excited atmospheric pressure carbon dioxide laser A 5 was set to emit a 10R(6) line at 966.23 cm$^{-1}$. A suitable number of CaF$_2$ crystal plates 8 were inserted between the laser and the reactor 1 such that the fluence in the reactor 1 would be adjusted to about 0.1 J/cm$^2$. The TEA CO$_2$ laser B 6 was not used in Comparative Example 2 and an irradiation experiment was conducted at a one-color. Under these experimental conditions, Si$_2$F$_6$ molecules were irradiated with 1000 pulses from the TEA CO$_2$ laser A 5.

From the difference between the infrared absorption spectra for both before and after laser irradiation, the yield of SiF$_4$ was determined. Only a very small amount of SiF$_4$ had been produced, indicating that the fluence of 0.1 J/cm$^2$ led to seldom occurrence of infrared multiple-photon dissociation of Si$_2$F$_6$. In order to induce infrared multiple-photon dissociation, the pulse beam from the high-fluence TEA CO$_2$ laser B 6 needs to be applied simultaneously with the pulse beam from the laser A 5.

ADVANTAGES OF THE INVENTION

In Example 1, the weak 10R(6) pulsed laser beam and the strong 10P(8) pulsed laser beam were simultaneously applied, each in 500 pulses; 34.7% of Si$_2$F$_6$ molecules were decomposed and the enrichment of $^{28}$Si in the residual Si$_2$F$_6$ molecules was as high as 99.63%. In Example 2, two pulsed laser beams were applied, each in 1000 pulses, under the same conditions as in Example 1; 46.9% of Si$_2$F$_6$ molecules were decomposed and the enrichment of $^{28}$Si in the residual Si$_2$F$_6$ were nearly 100%. Comparative Example 1 was the case of the one-color laser irradiation, in which the strong 10P(8) pulsed laser beam was applied to Si$_2$F$_6$ in 2000 pulses; 35.6% of Si$_2$F$_6$ molecules were decomposed and the enrichment of $^{28}$Si in the residual Si$_2$F$_6$ was 99.35%. In Comparative Example 2, it was shown that Si$_2$F$_6$ molecules were hardly decomposed when it was only irradiated to 1000 pulses of the weak 10R(6) pulsed laser beam. One can see the following from the comparison of Examples 1 and 2 with Comparative Example 1: in the invention method of separating silicon isotopes by applying multiple laser beams at different wavelengths, about 35% decomposition occurred to give a higher level of selectivity than in the conventional case of applying the one-color laser beam although only 500 pulses were applied which were a quarter of the conventionally required pulses. When the number of pulses increased to 1000, the enrichment of $^{28}$Si reached almost 100%. As one can see from the comparison between Examples 1 and 2, the decomposition of Si$_2$F$_6$ had a tendency to saturate as a function of the number of pulses applied and it was the highest at the initial stage, so were the separation and enrichment of $^{29}$Si and $^{30}$Si. The method developed by the present inventors can increase the efficiency of separating and enriching silicon isotopes, thereby opening a road toward mass-scale utilization of silicon isotopes.

What is claimed is:

1. A method for laser-assisted separation and enrichment of silicon isotopes $^{28}$Si, $^{29}$Si and $^{30}$Si on the basis of infrared multiple-photon dissociation of silicon halides represented by Si$_2$F$_6$, said method comprising synchronously irradiated the silicon halides with multiple pulsed laser beams at different wavelengths.

2. A method for TEA CO$_2$ laser-assisted separation and enrichment of silicon isotopes $^{28}$Si, $^{29}$Si and $^{30}$Si on the basis of infrared multiple-photon dissociation of Si$_2$F$_6$, said method comprising synchronously irradiating Si$_2$F$_6$ with multiple pulsed TEA CO$_2$ laser beams at different wavelengths.

* * * * *